United States Patent [19]

Zulawski

[11] Patent Number: 5,054,798
[45] Date of Patent: Oct. 8, 1991

[54] ADJUSTABLE STEERING POST WITH BEARINGS

[75] Inventor: Dennis P. Zulawski, St. Hilaire, Minn.

[73] Assignee: Arctco, Inc., Thief River Falls, Minn.

[21] Appl. No.: 491,518

[22] Filed: Mar. 12, 1990

[51] Int. Cl.⁵ ........................ B62B 17/02; B62K 21/16
[52] U.S. Cl. ..................... 280/16; 280/21.1; 180/182; 74/551.3
[58] Field of Search ............... 180/182; 280/15, 16, 280/21.1, 22, 278; 74/551.3, 551.4; 384/206, 207, 208, 209, 210

[56] References Cited

U.S. PATENT DOCUMENTS

| | | | |
|---|---|---|---|
| 2,827,340 | 3/1958 | Johnson | 384/209 |
| 3,627,389 | 12/1971 | Foote | 384/208 |
| 4,227,826 | 10/1980 | Conrad | 384/206 X |
| 4,337,958 | 7/1982 | Witt et al. | 280/16 |
| 4,688,817 | 8/1987 | Marier | 180/182 X |
| 4,767,901 | 8/1988 | Goyarts | 384/206 X |
| 4,826,184 | 5/1989 | Kuehmichel et al. | 280/21.1 |
| 4,842,424 | 6/1989 | Narkon et al. | 384/210 X |
| 4,844,627 | 7/1989 | Speakman | 384/208 |

Primary Examiner—Charles A. Marmor
Assistant Examiner—Kevin Hurley
Attorney, Agent, or Firm—Jerold M. Forsberg; James E. Olds

[57] ABSTRACT

A steering post for a snowmobile is positionable in more than one position and includes a bearing which has a two part bearing block and a two part bearing. The bearing includes a generally spherical body with axially aligned oppositely extending cylindrical extensions and a bore substantially the same diameter as the steering post axially aligned with and extending through the spherical body and extensions. The bearing body includes openings axially aligned and communicating with a cavity adapted to receive the spherical body therein. The openings include an encircling chamfered area engagable by the extensions on the spherical body such that when the steering post is out of alignment that it does not engage the bearing body and bind.

20 Claims, 2 Drawing Sheets

ADJUSTABLE STEERING POST WITH BEARINGS

BACKGROUND OF THE INVENTION

The present invention relates generally to an improved adjustable steering post assembly with self-aligning bearings, and more specifically to an improved bearing assembly which substantially eliminates binding of the steering post, facilitates assembly during manufacture, and permits the positioning of the steering post in more than one position for the improved comfort of the driver.

Snowmobiles typically have a steering post which is supported by bushings relative to the chassis, the steering post having a set of handle bars at the upper end thereof for gripping by the driver for the inducement of torque which results in the steering control of the skis. The steering post includes a pitman arm at its lower end which is a torque inducing component such that as the torque is transmitted along the steering post from the handlebars, the torque is then transferred through the pitman to the steering linkages of the steering system for the control of the skis.

It has been known for a steering post to bind in the typical prior art bushing type arrangements during flexing of the snowmobile chassis or when the driver is creating stresses in the steering post.

It is the elimination of binding of the steering post, the facilitating of assembly during manufacturing and the provision of adjustability that are the results of this invention. A significant advantage of the new and improved bearing assembly in conjunction with the steering post of a snowmobile is the adjustability of the inclination of the steering post relative to the chassis. Accordingly, people of varying heights and body sizes can be more comfortably accommodated.

One prior art arrangement, as depicted in U.S. Pat. No. 4,779,695, shows a snowmobile with a steering shaft assembly 42 which is shiftable forward and backward relative to the longitudinal direction of the vehicle. There is no adjustability of the inclination of the steering column relative to the chassis.

THE SUMMARY OF THE INVENTION

The present invention solves a number of problems with an innovative and improved bearing assembly which is self-aligning, light-weight, and easily assembled.

In accordance with the present invention, an improved steering post can be adjusted to more than one position relative to the chassis of the snowmobile thereby permitting a greater degree of comfort for a person utilizing the steering assembly. It has been known in prior art arrangements for the steering post to become bound when the snowmobile is being used for racing or for traveling over rugged terrain where stresses are induced in the chassis which twist and distort the mounting configuration for the steering post thereby making steering difficult and at times nearly impossible. Drivers of a snowmobile utilizing the bearing assembly of the instant invention can rest assured that the steering post, and consequently the steering of the snowmobile, will not be jammed or bound during flexing of the chassis of the snowmobile or when undue stresses are induced into the steering post and its mountings.

The instant invention utilizes a bearing assembly which is constructed of inexpensive materials and is light weight. The bearing assembly includes a two-part bearing block which has a cavity formed therein for receiving and rotatably supporting a bearing. The cavity is of a spherical configuration and is substantially the same size as the generally spherical bearing such that when the bearing is supported in the cavity, it is free to rotate but without excess tolerance. The bearing is generally spherical and has cylindrical extensions extending from either side thereof, the extensions being aligned so as to be coaxial. There is a bore through the spherical bearing which is a cylindrical bore with the axis of the cylindrical bore being aligned with the axis of the cylindrical extentions. The bearing block includes an annular chamfer disposed so as to act as a limiting stop for the rotatable movement that the bearing has relative to the block. Both the bearing block and bearing are formed in two pieces with the bearing having male and female cooperating elements for alignment thereby facilitating assembly of the bearing.

In a typical steering post assembly one bearing assembly is usually used near the upper end of the steering post and a second bearing assembly is used near the lower end of the steering post. The lower bearing assembly may be fixedly mounted relative to the chassis while the upper bearing assembly may be positionable in different positions without the need for changing the positioning of the lower assembly due to the self-aligning ability of the bearing within the bearing block. Additionally, any slight imperfections or misalignments which may occur during manufacturing are accommodated by the self-aligning nature of the bearing.

Accordingly, it is an object of the present invention to provide an improved steering post with self-aligning bearings for a snowmobile.

Another object of the present invention is to provide a self-aligning bearing for a shaft which is light-weight, simple to manufacture and easy to assemble to the shaft being supported.

Other objects and advantages of the present invention will be apparent and understood from the following detailed description when taken in conjunction with the accompanying drawings.

BRIEF DESCRIPTION OF THE DRAWINGS

An improved adjustable steering post with self-aligning bearings constructed in accordance with this invention is described hereinbelow with reference to the accompanying drawing, wherein.

DETAILED DESCRIPTION OF THE PREFERRED EMBODIMENT

Figure 1:
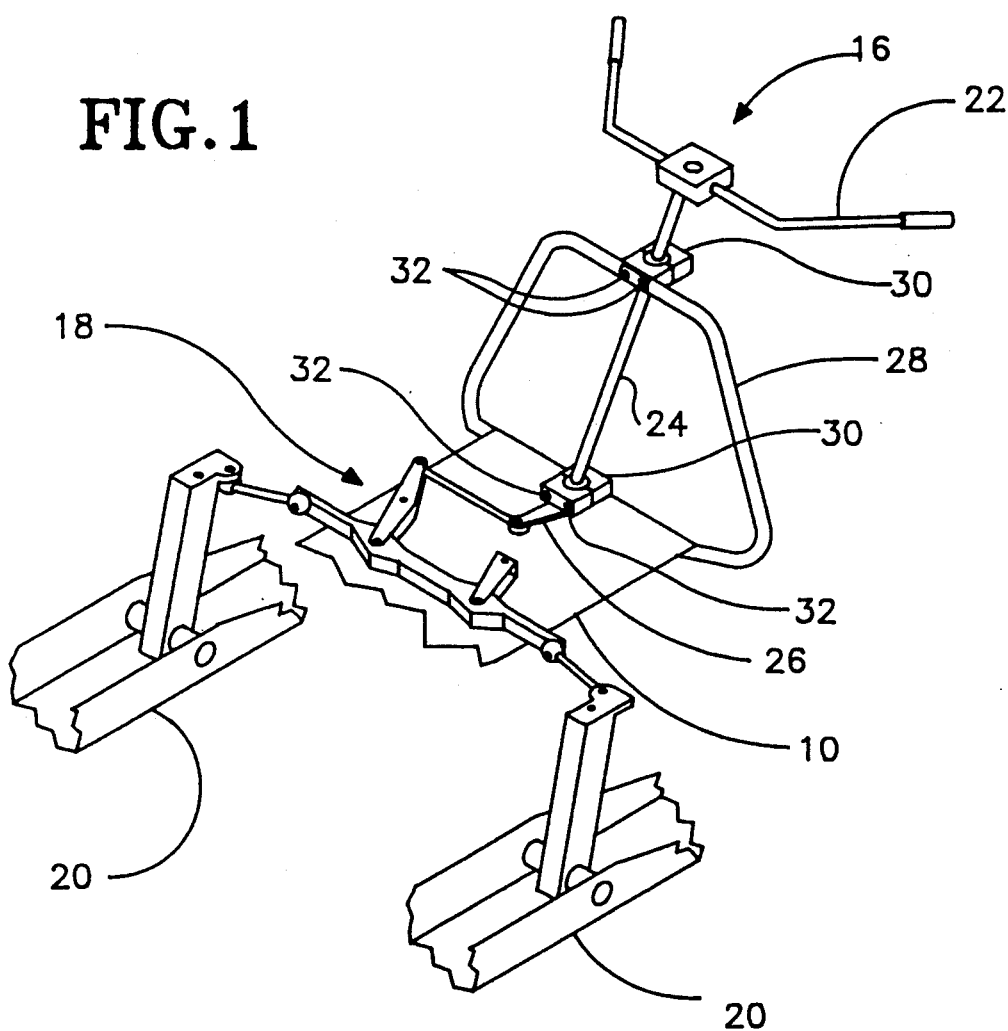
FIG. 1 is a simplified perspective view of a portion of a snowmobile chassis showing a steering post with bearing assemblies in accordance with the instant invention relative to the steering linkage assembly and skis of the snowmobile.

It should be noted that like reference numerals are used throughout the various views to designate similar elements or components.

Figure 2:
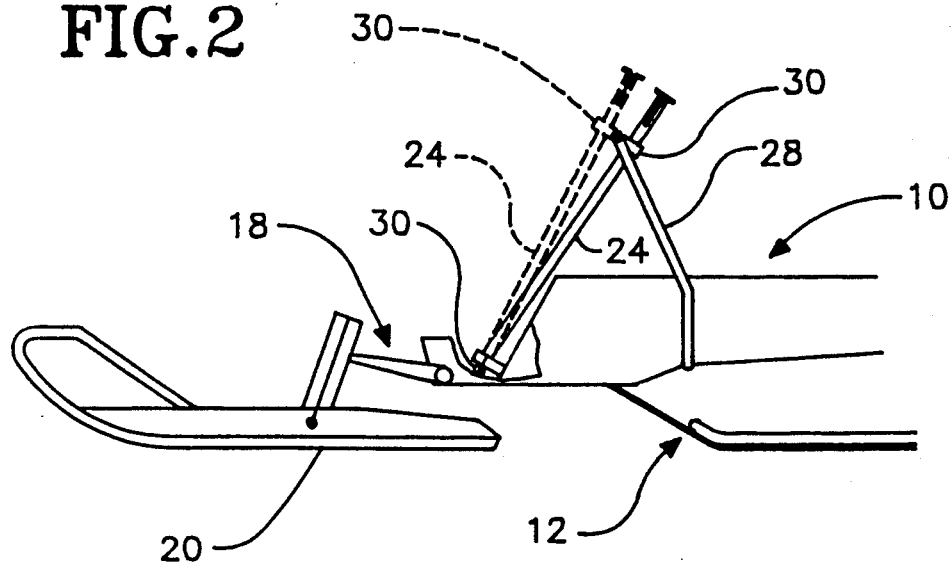
FIG. 2 is a simplified depiction of a snowmobile chassis showing a steering post in more than one inclined position relative to the chassis.

Referring now to FIGS. 1 and 2, a portion of a snowmobile chassis 10, of the type having a forwardly mounting engine (not shown), is depicted as having a traction unit 12, a seat area 14, a steering post assembly 16, and a steering linkage arrangement 18 attached to a pair of steerable skis 20.

Referring now to FIG. 1, steering post assembly 16 is shown as having handle bars 22 attached to the upper end of a steering post 24. Steering post 24 has a pitman 26 fixedly secured at its lower end which in turn is attached to the steering linkage system 18. Steering post 24 is supported relative to a frame member 28 of chassis 10 by bearing assemblies 30 constructed in accordance with the instant invention. As seen in FIG. 2, upper bearing assembly 30 can be attached to either side of frame member 28 by bolts 32 thereby providing for more than one inclined position of the steering post 24 relative to the chassis 10. The dashed-line configuration of steering post 24 shows a more upright position while the solid line position of steering post 24 is in a lower position.

Figure 3:
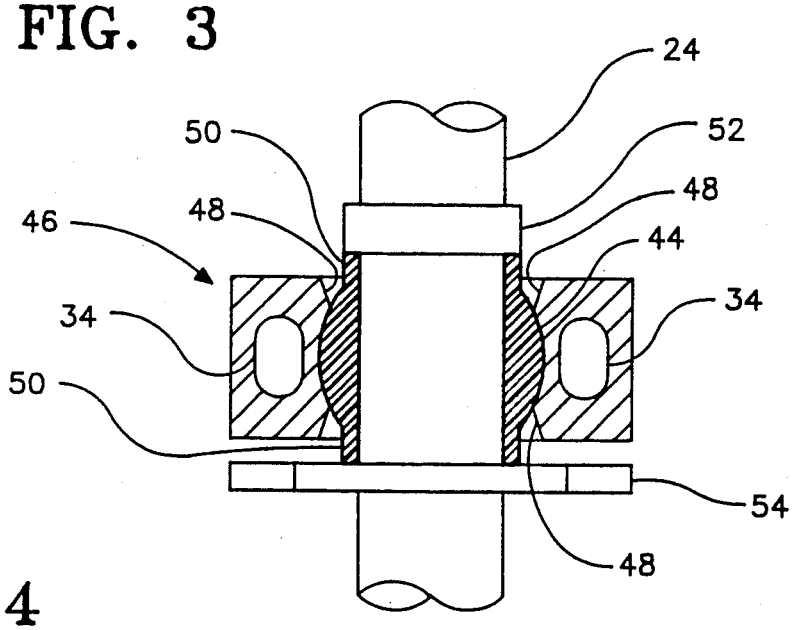
FIG. 3 is a detailed view showing a bearing of this invention in cross section relative to the steering post.
Figure 4:
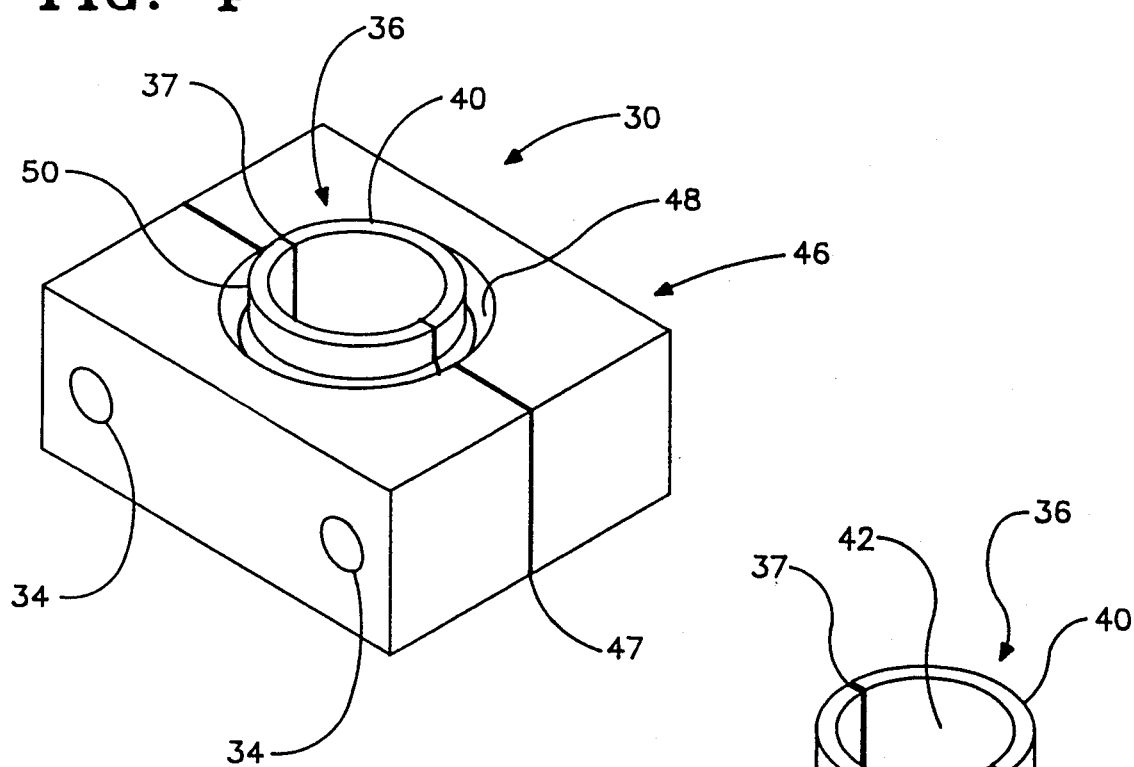
FIG. 4 is a perspective view of the bearing assembly.
Figure 5:
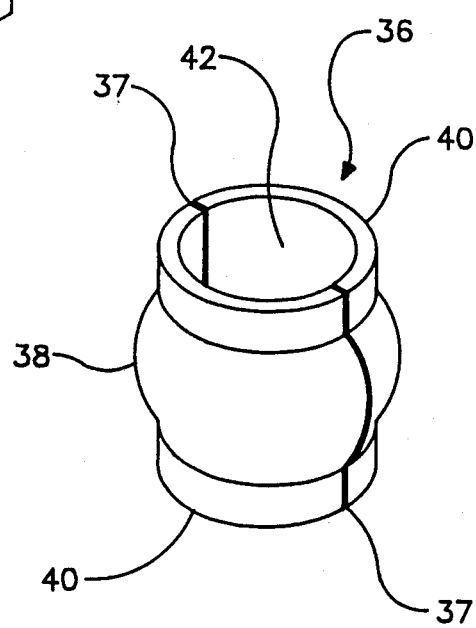
FIG. 5 is a perspective view of the bearing.

Referring now to FIGS. 3 through 5, FIG. 4 shows a bearing assembly 30 with a bearing 36 received in a bearing block 46. Apertures 34 receive bolts 32 for mounting of the bearing assembly to a supporting structure such as frame member 28 of chassis 10. It being clearly evident that bolts 32 received through bores 34 will also serve to secure the portions of the bearing 36 and bearing block 46 relative to one another. FIG. 5 shows the bearing 36. Bearing 36 includes a generally spherical body 38 with cylindrical extensions 40 extending in opposite directions from the spherical body 38. The cylindrical extensions 40 are axially aligned relative to one another. Bearing 36 has a cylindrical bore 42 extending through the cylindrical extensions 40 and spherical body 38 so as to be axially aligned with cylindrical extensions 40. Bearing 36 is made in two parts and is preferably is of a solid material such as a nylon or a teflon or any other structural plastic-type material which is light-weight, durable, and essentially self-lubricating.

Bearing 36 is supported in cavity 44 of bearing block 46. Cavity 44 has a generally spherical surface (see FIG. 3) which is complementary to the spherical body 38 and has tolerances such that spherical body 38, when received and supported by bearing block 46, is rotatable relative thereto. Bearing block 46 includes annular chamfered surfaces 48 which coact with outer surfaces 50 of the cylindrical extensions 40 to limit rotational movement of the bearing 36 within the bearing block 46.

As seen in FIG. 4, bearing block 46 has two identical portions which are able to be split apart for receiving the bearing 38 in the cavity 44. Bearing 38, in turn, is formed in two parts and includes male and female alignment elements associated with each mating surface of the split bearing such that assembly of the two-part bearing around a shaft such as steering post 24 is facilitated.

As seen in FIG. 3, steering post 24 may have a fixed stop 52 spaced generally the length of bearing 36 from another structural portion 54 fixedly attached to steering post 24 such that the two-part bearing 36 can be assembled around steering post 24 between the stop 52 and structural portion 54 with the bearing block 46 then assembled over the bearing parts and secured relative to the mounting frame member 28.

Referring again to FIG. 1, it should be readily apparent that the inducement of torque in steering post 24 by the rotation of handle bars 22 will in turn induce torque in pitman 26 thereby driving the steering linkage system in the desired direction. Bearings 36 of bearing assemblies 30 have the ability to self-align relative to the steering post 24 and any distortion of frame member 28 or steering post 24 will not bind steering post 24 thereby rendering it inoperative. The combined benefits of a nonbinding steering post with an adjustable steering post, such that the inclination of the steering post relative to the chassis may be changed is of substantial benefit in terms of safety and comfort.

It should be understood that other forms of the improved steering post with self-aligning bearings are contemplated by the present invention and that numerous modifications may be made by those of skill in the art without departing from the scope and spirit of the invention.

I claim:

1. An improved steering post for a snowmobile, the snowmobile including a chassis having a powered endless belt traction unit, a pair of forwardly mounted steerable skis, a front suspension system attaching the steerable skis to the chassis, and a steering linkage assembly interconnecting the skis wherein the steering post assembly cooperates with the steering linkage to steerably control the skis, the improvement comprising:

a steering post of a predetermined diameter positionable at more than one angle relative to the snowmobile chassis and having a manually engageable torque inducing means at an upper end and a pitman means for inducing torque at a lower end;

upper and lower bearing means for rotatably supporting the steering post relative to the snowmobile chassis, each of said bearing means including a split bearing block and a bearing having a generally spherical body with axially aligned oppositely extending cylindrical extensions of a predetermined diameter, each said spherical body having a bore substantially the same diameter as the steering post axially aligned with and extending through said spherical body and said extensions, said bearing block having a cavity for supporting the spherical body therein and axially aligned openings of a diameter larger than the diameter of said extensions communicating with said cavity; and attachment means for fastening said bearing blocks to the chassis of said snowmobile whereby said steering post is positionable at more than one angle relative to the snowmobile chassis by said attachment means and wherein said bearing means permits non-binding rotation of the steering post both when the axis of the steering post is coaxially aligned with the axially aligned openings and when the steering post is at an angle relative to the bearing blocks and the axially aligned openings.

2. An improved steering post assembly according to claim 1, wherein the cavity of each said bearing block includes an inner surface of spherical configuration closely fitting the spherical configuration of the bearing.

3. An improved steering post assembly according to claim 2, wherein each said bearing block is split into two equal pieces to facilitate assembly of the bearing and bearing block.

4. An improved steering post assembly according to claim 1, wherein there is a bearing means supporting the upper end of said steering post and a bearing means supporting the lower end of said steering post.

5. An improved steering post assembly according to claim 3, wherein each said bearing is formed in two equal parts to facilitate assembly of the bearing to said steering post.

6. An improved steering post assembly according to claim 2, wherein each said bearing block includes chamfered stops encircling each of the oppositely extending cylindrical extensions for limiting rotation of the bearing within said cavity.

7. An improved steering post assembly according to claim 6, wherein said attachment means includes releasable fasteners for releasably fastening each bearing block along with the bearing supported in each respective cavity to the chassis of the snowmobile, whereby said steering post can be positioned in more than one position by said bearing means thereby varying the inclination of the steering post relative to the chassis and the bearing block and variations in inclination of the steering post relative to the bearing block are accommodated by the rotatability of the bearing within the cavity.

8. An improved steering post assembly according to claim 7, wherein said releasable fasteners are a pair of bolts received in bores through each said bearing block, said bolts fastening each split bearing block to said chassis and about the bearing supported in the cavity.

9. An improved steering post assembly according to claim 8, wherein said chassis includes a frame member cooperating with said releasable fasteners for positioning of the steering post selectively in one of two positions.

10. An improved steering post assembly according to claim 5, wherein said equal parts of each said bearing include cooperating female and male alignment means for facilitating alignment of the parts of the bearing when disposed about the steering post.

11. An improved steering post assembly according to claim 1, wherein each said bearing is formed of a self-lubricating material.

12. An improved bearing assembly for a snowmobile steering post, the improvement comprising;
   bearing means for rotatably supporting a steering post relative to a snowmobile chassis, said bearing means including a split bearing block and a bearing having solid material, said bearing block having a cavity for supporting a generally spherical body, with axially aligned oppositely extending cylindrical extensions of a predetermined diameter, a bore substantially the same diameter as a steering post axially aligned with and extending through said spherical body and said extensions said bearing block having a cavity for supporting the spherical body therein and openings of a diameter larger than the diameter of said extensions communicating with said cavity; and
   attachment means for fastening said bearing block to a support whereby the bearing block is positionable at varying orientations relative to said bearing wherein said bearing functions in a non-binding manner.

13. An improved bearing assembly according to claim 12, wherein the cavity of said bearing block includes an inner surface of spherical configuration closely fitting the spherical configuration of the bearing.

14. An improved bearing assembly according to claim 13, wherein said bearing block is split into two equal pieces to facilitate assembly of the bearing and bearing block.

15. An improved bearing assembly according to claim 14, wherein said bearing is formed in two equal parts to facilitate assembly of the bearing to a steering post.

16. An improved bearing assembly according to claim 13, wherein said bearing block includes chamfered stops encircling each of the oppositely extending cylindrical extensions for limiting rotation of the bearing within said cavity.

17. An improved bearing assembly according to claim 16, wherein said attachment means includes releasable fasteners for releasably fastening the bearing block along with the bearing supported in said cavity to a chassis of a snowmobile, whereby a steering post can be positioned in more than one position by said bearing means thereby varying the inclination of the steering post relative to the chassis and the bearing block and variations in inclination of the steering post relative to the bearing block are accommodated by the rotatability of the bearing within the cavity.

18. An improved bearing assembly according to claim 17, wherein said releasable fasteners are a pair of bolts received in bores through said bearing block, said bolts fastening the split bearing block about the bearing supported in the cavity.

19. An improved bearing assembly according to claim 15, wherein said equal parts of said bearing include cooperating female and male alignment means for facilitating alignment of the parts of the bearing when juxtaposed.

20. An improved steering post assembly for a snowmobile, the snowmobile including a chassis having a powered endless belt traction unit, a pair of forwardly mounted steerable skis, a front suspension system attaching the steerable skis to the chassis, and a steering linkage assembly interconnecting the skis wherein the steering post assembly cooperates with the steering linkage assembly to steerably control the skis, the improvement comprising:
   a steering post positionable at more than one angle relative to the snowmobile chassis and having a manually engagable torque inducing means at an upper end and a pitman means for inducing torque at a lower end;
   bearing means releasably fastened to said snowmobile chassis supporting said steering post proximate the upper end and the lower end; and
   fastener means for releasably attaching the bearing means disposed proximate the upper end in more than one location on the snowmobile chassis whereby the angle of inclination of the steering post relative to the snowmobile chassis can be varied with the steering post being supported for non-binding rotation by the bearing means.

* * * * *